Nov. 4, 1941. E. G. RAMBERG Re. 21,936

ELECTRON MULTIPLIER

Original Filed May 26, 1937

Inventor

Edward G. Ramberg

By

Attorney

Reissued Nov. 4, 1941

Re. 21,936

UNITED STATES PATENT OFFICE 21,936

ELECTRON MULTIPLIER

Edward G. Ramberg, Haddon Heights, N. J., assignor to Radio Corporation of America, a corporation of Delaware Original No. 2,125,750, dated August 2, 1938, Serial No. 144,825, May 26, 1937. Application for reissue November 1, 1939, Serial No. 302,371

19 Claims. (Cl. 250—175)

Figure 1:
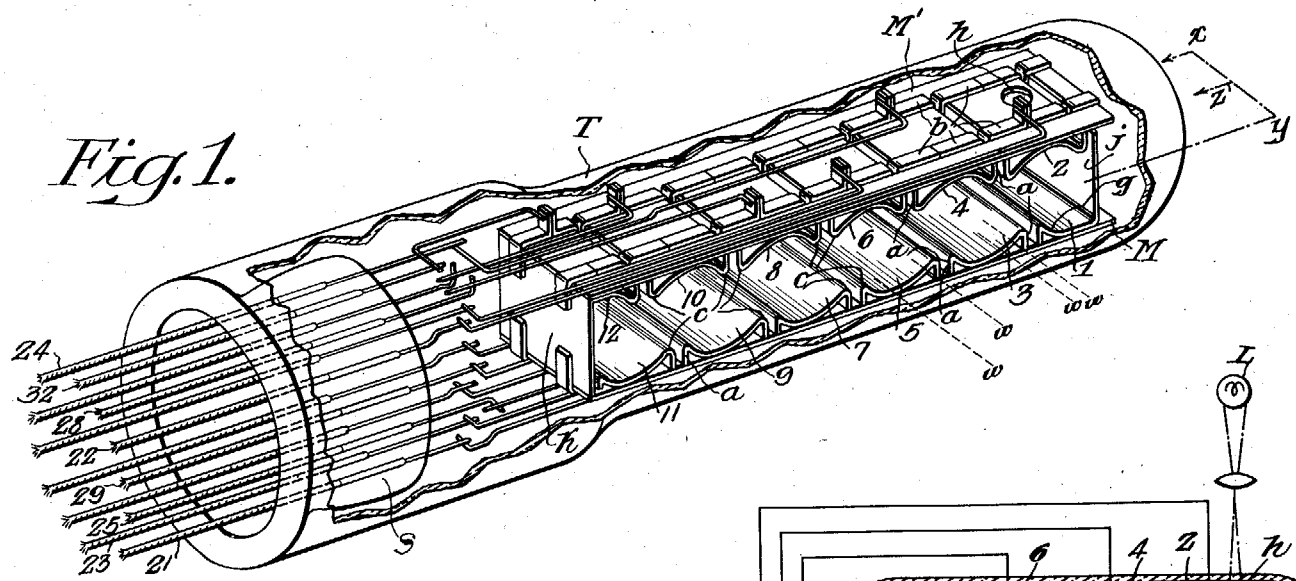

My invention relates to electric discharge devices, and particularly to devices of the type wherein amplification of a primary electron stream, such, for example, as is emitted from a thermionic cathode or from a photosensitive surface exposed to light, is accomplished through utilization of secondary-emission phenomena. The principal object of my present invention is to provide improvements in discharge tubes of the general type disclosed in my copending application Serial No. 107,955, filed October 28, 1936.

My earlier application (Serial No. 107,955) provides an electron multiplier of the electrostatic type wherein, by reason of certain correlated spacing and dimensions of the electrodes, and of the potentials to which said electrodes are subjected, the electrons are constrained to follow a predetermined inter-electrode path without any very substantial losses due to the electrons skipping or missing their targets.

More specifically stated, an electric discharge device constructed in accordance with the principle of my earlier invention may comprise an evacuated container, preferably, though not necessarily, cylindrical, wherein are disposed a plurality of sets of discrete multiplying electrodes, the electrodes lying in spaced-apart planes parallel to each other and to the long or major axis of the container. The electrodes constituting each set are spaced from each other a distance substantially equal to three-fourths of the length of a single plate measured along the major axis of the container. The electrodes of one set are preferably arranged in staggered relation with respect to the electrodes of the other set, that is to say, the space between two electrodes of a given set should preferably be directly opposite the center of an electrode of the other set. The electrodes, if desired, may be solid metallic plates. It is preferable, however, to form them partly of foraminous material, as such construction facilitates the application of the emissive material during construction of the device.

The terminal electrodes, i. e., the primary electron emitter (or cathode) and the collector electrode (or anode), preferably present so much of their surfaces in planes perpendicular to the planes of the other electrodes that the otherwise open ends of the electrode assembly are substantially closed to ensure a desired distribution of the electrostatic field present when the device is energized. Considering the cathode to be maintained at ground potential and the electrode upon which primary electrons from the cathode are to impinge to be maintained at +1V volts with respect to the cathode, then to ensure optimum performance each succeeding electrode, in point of electron travel, should preferably be maintained at a potential corresponding, respectively, to the mathematical series +2V, +3V, +4V, +5V, etc.

My present invention is predicated upon my discovery that the operating performance of discharge tubes constructed in accordance with my above described earlier invention may be adversely affected by the presence of stray magnetic fields. The presence of such a stray field may cause the electrons to depart from their desired inter-electrode paths and to impinge upon an electrode other than the one toward which they were initially directed. While it is entirely possible to shield the tubes against the effects of stray magnetic fields, it is not always practical to do this. Accordingly, my present invention contemplates, and its practice provides, an electron-multiplier of the described electrostatic type, the operation of which is not adversely affected by the presence of stray magnetic fields of low intensity.

Figure 2:
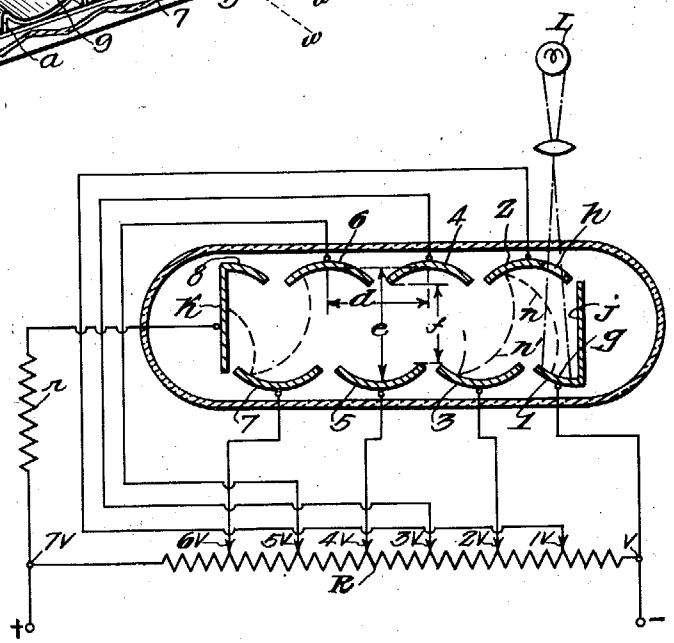

Other objects and advantages will be apparent and the invention itself will be best understood by reference to the following description and to the accompanying drawing, wherein Figure 1 is a view in perspective of a preferred embodiment of an electron-multiplier constructed in accordance with the principle of my invention, a portion of the envelope of the device being broken away to show the elements more clearly, and Figure 2 is a diagrammatic view of a device similar to that of Fig. 1, exemplifying the manner in which the several electrodes are energized when the device is utilized for certain of the purposes to which is is adapted.

The objects of my invention are achieved by substituting curved secondary-electron emissive surfaces of special design for the plane surfaced electrodes of my earlier invention.

Fig. 1 shows an improved electron-multiplier constructed in accordance with the principle of my invention. In the drawing, T designates an elongated evacuated tube having a plane of symmetry marked $x$—$y$ which extends along the central axis $z$ of the tube. A pair of oppositely located, parallelly-arranged strips M, M', of mica or other suitable insulating material, project outwardly from the stem S of the tube in planes parallel to the plane of symmetry $x$—$y$. Strips M, M' constitute a supporting structure for a set of "lower" electrodes, numbered 1, 3, 5, 7, 9, 11, respectively, and for a set of "upper" electrodes 2, 4, 6, 8, 10, 12, respectively.

The electrodes 1 to 12, inclusive, may be constituted, at least in part, of silver treated with a substance which is the equivalent of caesium. In accordance with my invention, they are of curved construction, concave on the side toward the plane of symmetry *x—y* of the tube. Stated another way: the generatrices (*w*) of all of these curved electron-emissive surfaces are parallel with each other and lie across or are normal to an axis (*z*) which spans the space between the cathode and anode. These electrodes preferably have a curvature less than or equal to that required to make them semi-cylinders. Each electrode is provided with at least one return bend portion *a* which terminates in one or more lugs *b* which extend through, and are secured to, one of the mica strips M. The transverse edges *c* of the curved plates 1 to 12 inclusive, i. e., those edges which are normal to the tube axis of symmetry Z, are preferably rounded to obviate "cold discharge" between adjacent electrode edges when the tube is in operation.

The odd numbered or "lower" electrodes are arranged in staggered relation with respect to the even numbered or "upper" electrodes, that is to say, the transverse edge *c* of each lower electrode is opposite the mid portion of an upper electrode. By way of example, a line drawn midway between two adjacent transverse edges *c* should preferably register with a transverse line bisecting an upper electrode. Each electrode is provided with a conductive rod-like lead 21 to 32, respectively, which extends through the stem S to the exterior of the tube.

Referring to Fig. 2, assuming that the distance *d* between corresponding points on adjacent electrodes of a given series to be equal to 1 (say, one inch), then the maximum distance measured along line *e*, between parallel planes tangent to the two series of electrodes, should preferably be no smaller than ½, and the minimum spacing, measured along line *f*, between the planes of the linear edges (*c*, Fig. 1) of the two series, should preferably be no greater than 1. Thus, satisfactory performance has been achieved with an electron-multiplier having six multiplying stages, wherein the distance *d* was substantially 1'', the maximum spacing *e* was substantially $1\frac{5}{16}$'', and the minimum spacing *f* was substantially ¾''.

Section *g* of electrode 1 constitutes a photosensitive primary electron emitting cathode. It is adapted to be actuated by light from an external source L (Fig. 2) which is positioned to shine through an orifice *h* in electrode 2 opposite thereto. The light supplied by source L may be steady or fluctuating in character. Section *j* of cathode 1 is bent at a right angle to the electron emitting surface *g*, whereby to effectively close the otherwise open end of the electrode assembly. The outer edges of electrodes 1 and 2 do not touch. The "upper" electrode 12, nearest the stem S, is the anode; it has a section *k* which extends toward but does not touch electrode 11, and effectively closes this end of the assembly. It is upon this section *k* that the electrons are eventually collected.

With the electrodes designed, positioned and arranged in the manner described, the electrostatic field adjacent the ends of the assembly will correspond substantially to that obtaining adjacent and between the central electrodes (say 6, 7), so that the electrons emitted from corresponding points on the several electrodes will travel similar paths to their respective targets.

As heretofore mentioned, and in accordance with the teachings of my earlier filed application, the potential distribution among the electrodes required to ensure optimum performance may be expressed by the mathematical series 1V, 2V, 3V, 4V, 5V, 6V, etc., where 1V is the potential drop between the primary electron source and the first target electrode 2, and 2V, 3V, 4V, etc., represent the potential drop between the respective succeeding electrodes, in point of electron travel, and said source.

For the purpose of providing such a potential distribution, the cathode may be connected to the negative terminal of a source of unidirectional potential, exemplified in the drawing by a resistor R, and the first multiplying electrode, i. e., the electrode 2, the surface of which is opposite the photosensitive portion *g* of cathode 1, connected to a point 1V somewhat more positive. The other electrodes 3 to 8, in the order of their numbers, are shown connected to successively more positive points 3V to 7V, respectively, on the resistor.

The reference characters 1V, 2V, 3V, 4V, etc., given to the several points on the resistor R, will be understood to indicate that the voltage drop between a given electrode and its next preceding electrode, in point of electron travel, is the designated whole number multiple of the voltage drop existing between the cathode 1 and the first multiplying electrode 2. Thus, in a device of the previously described construction, where the potential drop between the first multiplying electrode 2 and the cathode 1 is 100 volts, the drop between electrode 3 and 1 should be 200 volts, and that between electrode 4 and 1, 300 volts.

If a beam of light of varying intensity is caused to fall upon the first "lower" electrode 1, photo-electrons will be emitted in a quantity determined by the instantaneous intensity of the light beam. These photo-electrons will be accelerated toward the "upper" electrode 2 and, because of the described correlation between electrode spacing and applied voltages, will impinge upon the imperforate half of the first multiplying electrode 2. The path the photo-electrons travel from the cathode 1 to electrode 2 is not a straight one, but is curved as indicated by the dotted line *n*. The photo or primary-electrons striking electrode 2 will cause the emission of secondary electrons, the number of secondary electrons released being dependent in part upon the magnitude of the potential difference between it and the cathode.

The next electrode in point of electron travel is the second "lower" electrode 3. The path between electrodes 2 and 3, indicated by line *n'*, like that between electrodes 1 and 2 is not straight, but curved. The arc of curvature of the paths *n* and *n'* may be accentuated in the presence of a stray magnetic field, so much so in fact that a field of certain intensity and orientation may cause the electrons to barely graze or even miss a flat surfaced electrode.

This tendency of the electrons to skip or miss the electrode toward which they are directed is very greatly reduced, in accordance with my invention, when the electrodes are concave on the side upon which the electrons impinge, for, as indicated in the drawing, the inwardly directed curved surfaces present more of a barrier to "escaping" electrons than would a plane surfaced electrode.

The trajectory of the secondary electrons from electrode 3 to electrode 4 will be understood to be similar to that above described and such that a multiplication, by reason of secondary emission, is secured. These steps are repeated in any number of stages until the amplified stream of secondary electrons is collected by the output electrode and caused to flow in a utilization circuit exemplified in the drawing by the resistor "r" included between the output electrode and the positive terminal 6V of the potential divider.

A thermionic primary-electron source, instead of a photoelectric source, may be employed if desired, to render the device capable of uses to which well known thermionic tubes are put. Control and auxiliary grids may be employed, if necessary or desirable.

Other modifications of the invention will be apparent to those skilled in the art. It is to be understood, therefore, that the foregoing is to be interpreted as illustrative and not in a limiting sense, except as required by the prior art and by the spirit of the appended claims.

What is claimed is:

1. An electron multiplier comprising an evacuated envelope containing an electrode supporting strip constituted of insulating material, a plurality of emissive electrodes mounted in spaced relation thereon, said electrodes being of substantially duplicate construction and comprising a concave surface provided with return bend portions secured to said insulating strip, the linear edges of said electrodes intermediate said concave and return bend portions being rounded to reduce the possibility of arcing between the edges of adjacent of said electrodes when said electrodes are energized.

2. An electron-multiplier comprising a plurality of curved electron-emissive surfaces mounted in spaced relation on opposite sides of an axis which is normal to the generatrices of said curved emissive surfaces.

3. The invention as set forth in claim 2 wherein said curved emissive-surfaces are concave on the side facing said axis.

4. An electron-multiplier comprising a cathode, an anode and a plurality of curved electron-emissive surfaces mounted on opposite sides of an axis which extends between said cathode and anode, the generatrices of said curved emissive-surfaces being substantially normal to said axis and parallel with each other.

5. The invention as set forth in claim 4 wherein said curved electron-emissive surfaces are of substantially duplicate construction and are of a curvature substantially no greater than required to make them semi-cylinders.

6. An electron-multiplier comprising an evacuated envelope containing a cathode, an anode and a plurality of sets of concave electron-emissive surfaces mounted in spaced relation on opposite sides of an axis which spans the space between said cathode and anode, the generatrices of said concave electron-emissive surfaces being transverse with respect to said axis.

7. The invention as set forth in claim 6 wherein the concave electron-emissive surfaces of one set are offset in the direction of the anode from the concave electron-emissive surfaces of another set.

8. The invention as set forth in claim 6 wherein said cathode is constituted at least in part of a concave photosensitive surface mounted on one side of said axis, and said anode is constituted at least in part of a concave metal plate mounted on the opposite side of said axis.

9. The invention as set forth in claim 6 wherein the distance between corresponding points on adjacent concave surfaces of each set is equal to one, the distance between parallel planes tangent to said opposite series of concave surfaces is substantially no less than one-half, and the minimum distance between opposite of said concave surfaces is substantially no greater than one.

10. An electron multiplier comprising a primary cathode, a collector electrode spaced from said cathode, and a pair of rows of secondary electron emissive members between said primary cathode and said collector electrode, the members in one of said rows having dished surfaces facing the members in the other of said rows, said surfaces being dished transverse to the longitudinal axis of said one row, and certain of said surfaces each overlapping two successive electron emissive members in said other row.

11. An electron multiplier comprising a primary cathode, a collector electrode, a pair of rows of secondary cathodes extending between said collector electrode and said primary cathode and having opposed dished surfaces, said surfaces being dished away from the medial plane between said rows and having their end portions extending toward said medial plane.

12. An electron multiplier comprising a primary cathode, a collector electrode, and a plurality of substantially identical secondary cathodes mounted in two rows and in staggered relation between said primary cathode and said collector electrode, said secondary cathodes being equally spaced from a medial plane between said rows and the secondary cathodes in said rows being equally spaced from one another, said secondary cathodes having portions at opposite ends inclined toward said medial plane.

13. An electron multiplier comprising a primary cathode, a collector electrode, a pair of rows of substantially identical secondary cathodes between said primary cathode and said collector electrode, said cathodes having opposed surfaces dished and the end portions thereof toward said collector electrode extending toward said other row, and the cathodes in one row being in staggered relation with those in the other row, the cathodes in said rows having glide plane symmetry with respect to a medial plane extending between said rows, and being symmetrical with respect to a longitudinal plane normal to said medial plane.

14. An electron multiplier comprising a primary cathode, a collector electrode spaced from said cathode, and a plurality of secondary cathodes on opposite sides of a plane extending between said primary cathode and said collector electrode, said secondary cathodes having dished faces the generatrices of which are substantially parallel to said plane, and the dished faces of the secondary cathodes on one side of said plane facing the dished faces of the secondary cathodes on the other side of said plane.

15. An electron multiplier in accordance with claim 14 wherein said faces are substantially identical.

16. An electron multiplier comprising a primary cathode, a collector electrode spaced from said primary cathode, and a pair of sets of secondary electron emissive surfaces on opposite sides of an axis extending between said primary cathode and said collector electrode, said surfaces being transversely dished and the surfaces of each of said sets facing those of the other.

17. An electron multiplier comprising a primary cathode, a collector electrode spaced from said primary cathode, a pair of rows of secondary cathodes extending between said primary cathode and said collector electrode, the secondary cathodes in one row being in staggered relation with those in the other, and the cathodes in both rows having field-shaping portions at opposite ends each of which extends an equal distance toward the other row.

18. An electron multiplier comprising an evacuated envelope containing a cathode, an anode, a plurality of sets of dished electron emissive surfaces mounted in spaced relation on opposite sides of a median line which spans the space between said cathode and anode, the generatrices of said dished electron emissive surfaces being transverse with respect to said line.

19. The invention as set forth in the preceding claim and wherein the dished electron emissive surfaces of one set are offset in the direction of the anode from the dished electron emissive surfaces of another set.

EDWARD G. RAMBERG.